United States Patent
Illg et al.

(10) Patent No.: US 11,434,807 B2
(45) Date of Patent: Sep. 6, 2022

(54) FAN HOUSING FOR A VEHICLE SYSTEM

(71) Applicant: DEERE & COMPANY, Moline, IL (US)

(72) Inventors: Paul Illg, Neckarsulm (DE); Alexander Berg, Mannheim (DE); Phouphadeth Sananikone, Ludwigshafen (DE); Bhuvaneshwar Singh, Gorakhpur (IN); Amruta Joshi, Karad (IN); Martin Kieser, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 121 days.

(21) Appl. No.: 16/995,214

(22) Filed: Aug. 17, 2020

(65) Prior Publication Data
US 2021/0062707 A1   Mar. 4, 2021

(30) Foreign Application Priority Data

Sep. 2, 2019   (DE) .......................... 102019213195.6

(51) Int. Cl.
| | |
|---|---|
| *B60K 11/00* | (2006.01) |
| *F01P 5/06* | (2006.01) |
| *B01D 46/00* | (2022.01) |
| *F01P 3/18* | (2006.01) |
| *F02M 35/02* | (2006.01) |
| *F02M 35/024* | (2006.01) |
| *B01D 46/66* | (2022.01) |

(52) U.S. Cl.
CPC ............ *F01P 5/06* (2013.01); *B01D 46/0049* (2013.01); *B01D 46/66* (2022.01); *F01P 3/18* (2013.01); *F02M 35/024* (2013.01); *F02M 35/0204* (2013.01); *B01D 2279/60* (2013.01)

(58) Field of Classification Search
CPC .......... F01P 5/06; F01P 11/10; F01P 2070/50
USPC ........................................................ 180/68.2
See application file for complete search history.

(56) References Cited

U.S. PATENT DOCUMENTS

| | | | | |
|---|---|---|---|---|
| 5,427,502 | A * | 6/1995 | Hudson ................. | F02M 35/06 55/385.3 |
| 6,907,854 | B2* | 6/2005 | Wikner ................. | F02M 35/08 55/439 |
| 6,976,825 | B2 | 12/2005 | Wikner | |
| 7,278,504 | B2* | 10/2007 | Smith ................... | F02M 35/06 180/68.2 |
| 7,481,287 | B2 | 1/2009 | Madson et al. | |

(Continued)

FOREIGN PATENT DOCUMENTS

| | | |
|---|---|---|
| EP | 1520977 A2 | 4/2005 |
| EP | 1865207 A2 | 12/2007 |
| EP | 2067952 A2 | 6/2009 |

OTHER PUBLICATIONS

European Search Report issued in counterpart application No. 20192660.7 dated Feb. 1, 2021 (07 pages).

*Primary Examiner* — Long T Tran
*Assistant Examiner* — James J Kim

(57) ABSTRACT

A fan housing for a vehicle system includes a housing frame extending in a peripheral direction and penetrated by a connection opening for suctioning external air or external particles. A suctioned airflow or particle flow flows through the housing frame as a suction flow and in a direction of flow. Starting from the connection opening, a connection pipe extends in a direction outside the housing frame and a partition extends in a direction inside the housing frame.

2 Claims, 3 Drawing Sheets

(56) References Cited

U.S. PATENT DOCUMENTS

| | | | |
|---|---|---|---|
| 8,256,496 B2* | 9/2012 | Shuttleworth | F01P 5/06 123/41.31 |
| 9,222,448 B2* | 12/2015 | Ghorpade | F02M 35/164 |
| 2007/0277752 A1 | 12/2007 | Smith et al. | |

* cited by examiner

FAN HOUSING FOR A VEHICLE SYSTEM

RELATED APPLICATIONS

This application claims priority to German Patent Application Ser. No. 102019213195.6, filed Sep. 2, 2019, the disclosure of which is hereby incorporated by reference in its entirety.

FIELD OF THE DISCLOSURE

The present disclosure relates to a fan housing for a vehicle system.

BACKGROUND

Conventional fan housings are inserted between an engine radiator and an axial fan, for example, in a cooling arrangement for cooling the drive engine of a utility vehicle. In this case, the fan housing has a negative pressure connection, via which an external airflow comprising particles is suctioned, since the negative pressure connection cooperates with a suction region of the axial fan on the low pressure side. Particles which have been pre-separated in a two-stage air filter may be suctioned in this manner from the air filter and removed to the surroundings via the fan housing and the axial fan.

There is, however, a need to improve or develop the technical functionality of a fan housing.

SUMMARY

In the present disclosure, a fan housing for a vehicle system has a housing frame which runs in a peripheral direction and which is penetrated by a connection opening for suctioning external air or external particles. The connection opening is a component of a negative pressure connection configured on the fan housing. The suction flow suctioned via the negative pressure connection (external air or external particles) is able to flow through the housing frame in a direction of flow. Starting from the connection opening, a connection pipe for the air to be suctioned or particles to be suctioned extends in the direction outside the housing frame. Starting from the connection opening, a partition extends in an opposing direction, i.e., in the direction inside the housing frame.

The partition, on the one hand, has a technical conducting and guiding function for the suction flow reaching the housing frame, so that when the partition is functionally combined with the external connection pipe it is possible to eliminate flow components such as, for example, suction pipes, suction funnels and the like, protruding into the housing frame from the outside. As a result, the performance (for example, the cooling capacity) of a device adjoining the fan housing and generating a negative pressure (for example, an axial or radial fan of a cooling arrangement of the vehicle system) may be improved since no disruptive components of the fan housing are present in the suction region of this device on the low pressure side. Moreover, further undesired effects may be avoided by eliminating the aforementioned flow components. In the case of a fan (for example, an axial or radial fan, a main fan), it is possible to avoid undesired noises which might be produced as a result of positioning the flow components on the fan, for example. Additionally, the elimination of additional flow components simplifies the construction and thus the assembly of the fan housing even in the case of confined installation conditions.

Moreover, the partition forms a type of return stage for the airflow or particle flow (suction flow) suctioned into the housing frame through the connection opening.

As a result, in terms of construction technology the fan housing is able to separate or decouple from one another the aforementioned suction flow and further air paths (for example, cool air flowing through a heat exchanger, the fan housing and a fan) in a simple manner. More specifically, a free end of the partition forms a flow separation edge which relative to the direction of the suction flow effects a flow separation in a region directly downstream of the partition and thus a separation of the flow paths upstream and downstream thereof. This improves the functionality of the fan housing in terms of the desired suction effect.

The housing frame runs in the peripheral direction, in particular in a self-contained manner, and as a result assists a mechanically stable construction of the fan housing. The connection pipe or the partition are, in particular, an integral component of the fan housing and thus integrally connected to the housing frame.

The vehicle system is, in particular, a utility vehicle from the agricultural, forestry or construction vehicle sector.

Relative to the direction of flow, the partition is arranged downstream of the suction flow which flows into the housing frame. As a result, it is possible to assist the generation of a negative pressure in the direction of flow upstream of the partition in a technically simple and efficient manner.

A decoupling of different airflows through the partition is further improved when the partition is arranged approximately parallel to a frame plane of the housing frame spanned by the peripheral direction. In the case of a cooling arrangement of the vehicle system, therefore, the partition runs approximately in the vertical direction of the vehicle system.

Relative to the direction of flow, starting from the connection opening the connection pipe or its central longitudinal axis extends in an inclined manner to the rear. By a correspondingly geometrically dimensioned inclination and optionally also the implementation of bending radii on the connection pipe, it is possible to avoid sharp and thus disruptive deflections of the suction flow along its flow path. The extent of the connection pipe, which is inclined to the rear relative to the direction of flow, contributes to the connection pipe being decoupled regarding its arrangement relative to a device adjoining the fan housing and generating a negative pressure (for example, an axial fan of a cooling arrangement of the vehicle system). Thus, the fan housing may be dimensioned in a very space-saving manner.

In a further embodiment, starting from the connection opening, the connection pipe or its central longitudinal axis extends in an inclined manner in or counter to the peripheral direction of the housing frame. In other words, in a frame plane of the housing frame spanned by the peripheral direction, the connection pipe is inclined in or counter to the peripheral direction. As a result, it is also possible to avoid deflections of the flow path inside the fan housing, the deflections being unnecessary and consequently reducing the efficiency. Thus, for example, the rotational direction of an axial fan combined with the fan housing may be taken into consideration.

The fan housing is used, in particular, as a suction stage on an axial fan of a cooling arrangement of the vehicle system. In this case, the fan housing is arranged between a heat exchanger and the axial fan. The connection pipe of the fan housing corresponds to a suction region of the axial fan on the low pressure side. Negative pressure is generated at this suction region for suctioning and removing external particles. The particles are suctioned, for example, from an air filter for the cleaning thereof. In this case, the connection pipe is connected to the air filter via a suitable suction line. As a result, the fan housing is able to serve as a suction stage of technically simple construction for a controlled suctioning of external particles.

The air filter itself is used, for example, for cleaning the combustion air (for example, charge air of a turbocharger) supplied to a combustion engine (for example, a diesel engine). The air filter may also be a component of an air filter system of a cab ventilation of the vehicle system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
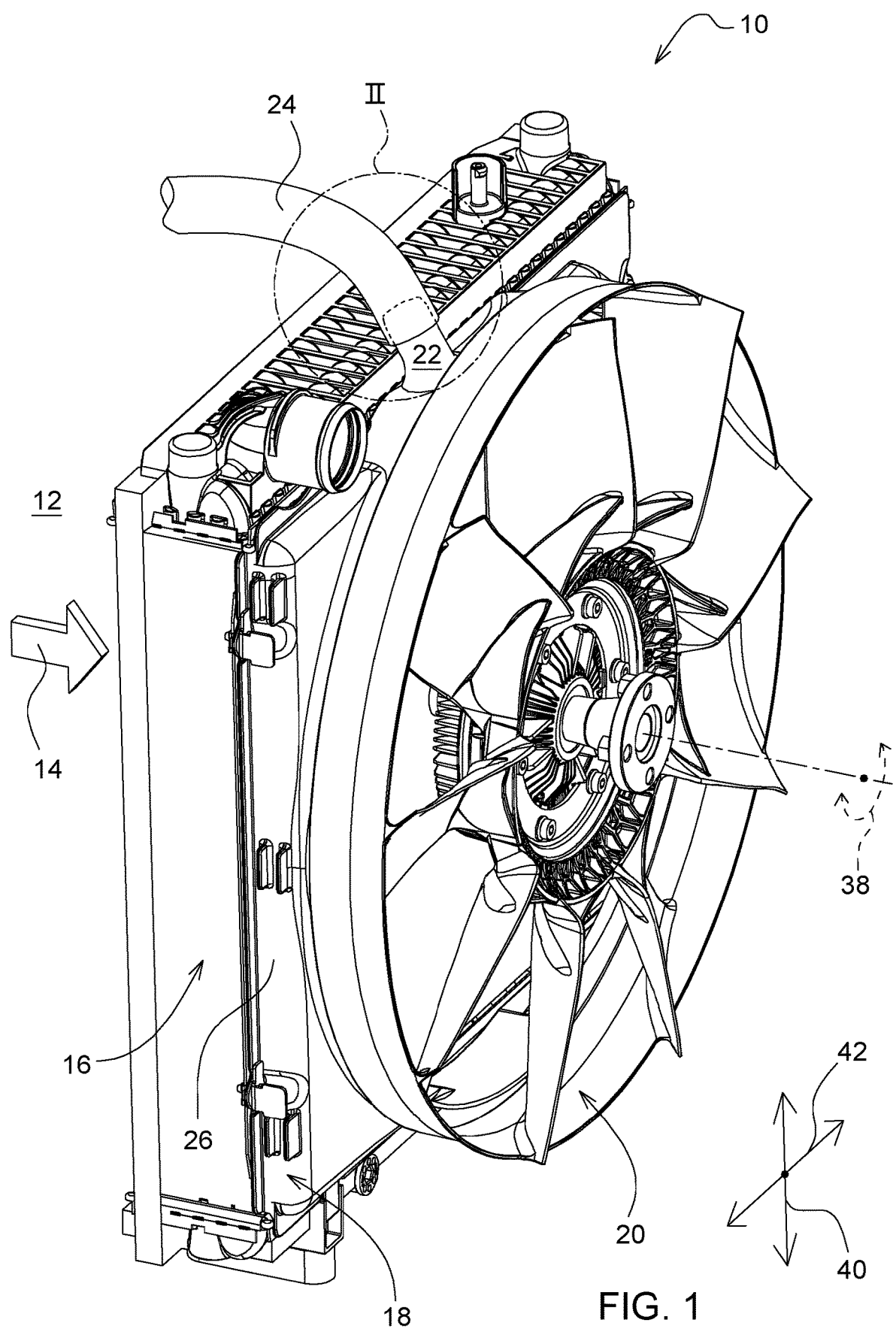
FIG. 1 shows a perspective view of an exemplary embodiment of the fan housing according to the present disclosure inside a cooling arrangement of a vehicle system.

FIG. 1 shows components of a cooling arrangement 10 of a vehicle system, for example, of an agricultural utility vehicle, in particular a tractor. In this case, cool air 12 flows through an engine radiator or heat exchanger 16, a fan housing 18 and a main fan or axial fan 20 in succession along a flow path 14. The heat exchanger 16 is a component of a cooling circuit (not shown here in more detail) for cooling an internal combustion engine of the vehicle system. For the sake of completeness, it should be mentioned that a use of the fan housing 18 does not have to be limited to heat exchangers for cooling an internal combustion engine. Instead, it may be also be a separately cooled charge air cooler, or the like. A radial fan or generally a device for generating negative pressure of any design may be provided instead of the axial fan 20.

The fan housing 18 acts as a suction stage for suctioning external particles which are thus removed to the surroundings by the axial fan 20, as a result of the rotational fan movements thereof. For suctioning the particles, the fan housing 18 has a suction pipe 22, a suction line 24 being connected thereto. The suction line leads to an air filter of the vehicle system, not shown here. Particles which have been pre-separated due to the filtering action and which are intended to be suctioned via the suction line, collect in the filter housing of the air filter.

In the illustrated embodiment, the approximately rectangular or square cross section of a housing frame 26 of the fan housing 18 is penetrated by a connection opening 28 in its upper region relative to the installed position, which may be identified in FIG. 1. Together with the connection pipe 22 the connection opening 28 serves for suctioning external particles from the aforementioned air filter. A corresponding particle flow or suction flow 30 flows through the housing frame 26 in a direction of flow 32.

Figure 2:
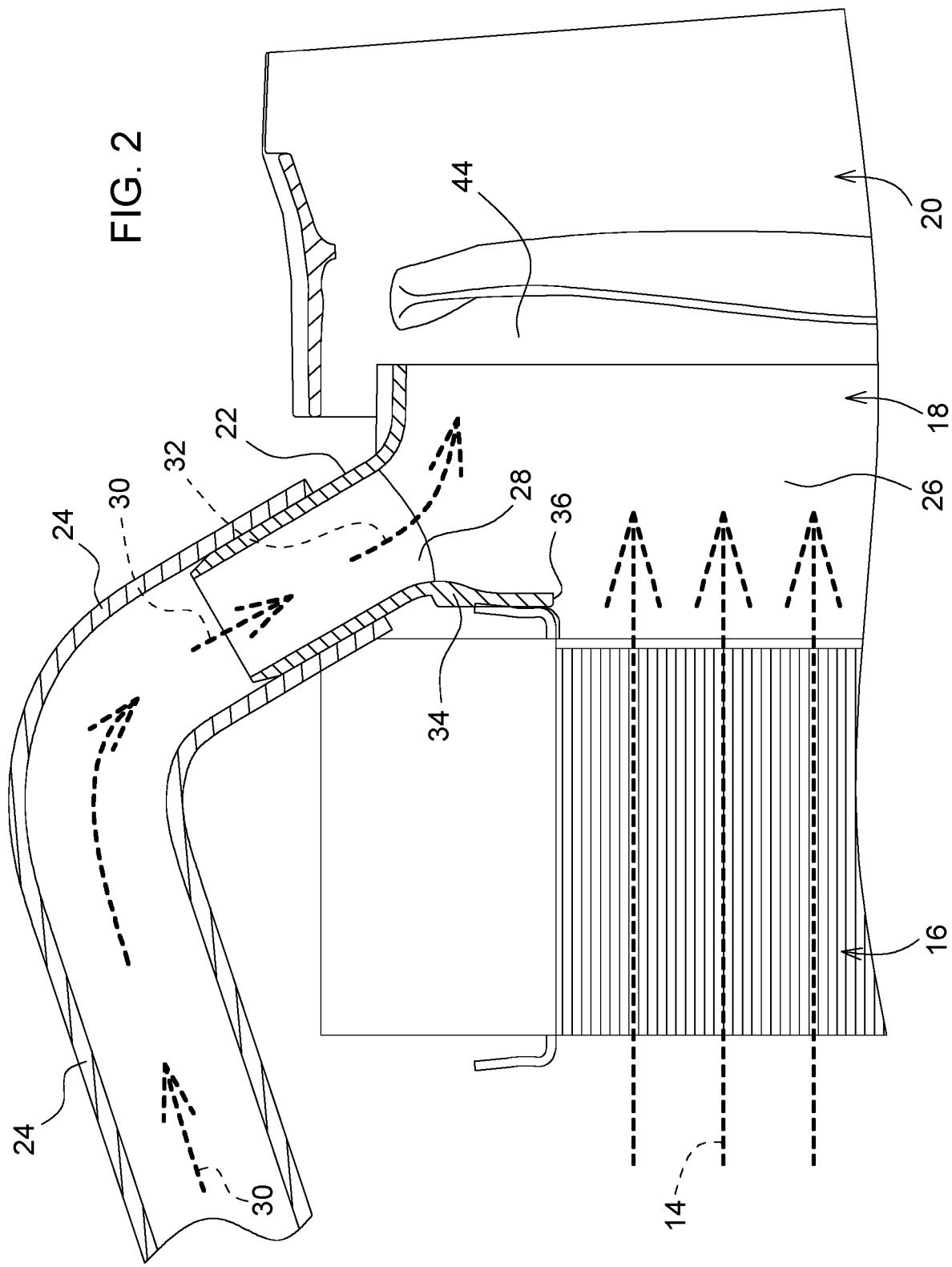
FIG. 2 shows an enlarged and sectional side view, for example, of the detail II in FIG. 1.

In FIG. 2 it may be identified that, starting from the connection opening 28, the connection pipe 22 extends in the direction outside the housing frame 26. Starting from the connection opening 28, a partition 34 extends in the direction inside the housing frame 26. In this case, the partition 34 is arranged downstream of the particle flow or suction flow 30 relative to the direction of flow 32. The partition 34 is at least partially arranged as far as its free end 36 approximately parallel to a frame plane spanned by the peripheral direction 38 of the housing frame 26. This imaginary frame plane runs parallel to a plane of the vehicle system spanned by the vertical direction 40 and the transverse direction 42.

It may be further derived from FIG. 2 that relative to the suction flow 30 the partition 34 acts as a type of return stage, the free end 36 thereof being configured to be relatively sharp-edged. The design and arrangement of the partition 34 inside the housing frame 26 or inside the fan housing 18 effects a separation of the flow path 14 and the suction flow 30 from one another in the direction of flow 32. In other words, the flow path 14 and the suction flow 30 are decoupled by the partition 34. The partition 34 may thus stabilize and intensify the negative pressure created by the axial fan 20 in the region 44 on the low pressure side.

In FIG. 1 and FIG. 2, it may also be identified that starting from the connection opening 28 the connection pipe 22 extends in an inclined manner to the rear relative to the direction of flow 32 of the suction flow 30.

Figure 3:
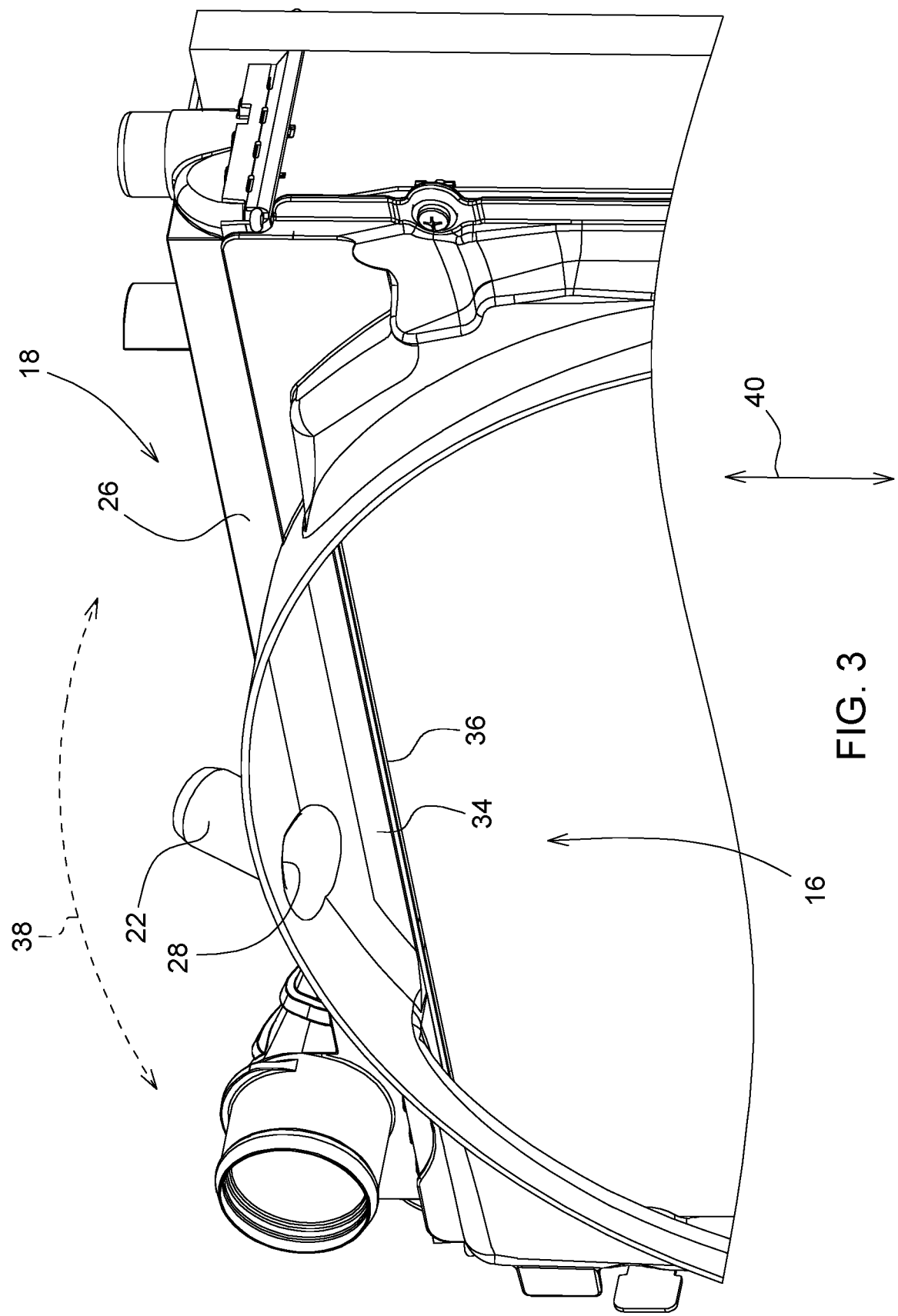
FIG. 3 shows a perspective partial view of the fan housing according to FIG. 1.

In FIG. 3 it may be identified that starting from the connection opening 28, the connection pipe 22 also extends in an inclined manner in the peripheral direction 38, deviating from or angled relative to the vertical direction 40.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cooling circuit for cooling an engine of a vehicle system, comprising:
   a heat exchanger;
   a connection pipe;
   a fan housing including a housing frame defining a connection opening at a periphery in an upper region of the housing frame, the connection opening coupled to the connection pipe;
   a fan disposed downstream of the connection opening and the heat exchanger, the connection opening disposed between the heat exchanger and the fan;
   a first airflow of particles suctioned through the connection pipe and into the fan housing via the connection opening disposed at a first incline in a rear direction;
   a second airflow of particles configured to flow through the heat exchanger and into the fan housing; and
   a partition extending into the fan housing downstream of the first and second airflows, the partition separating the first and second airflows from one another at the periphery in the upper region of the housing frame, the partition including a substantially vertical free end disposed within the periphery in the upper region of the housing frame, the free end being sharp-edged;

wherein the connection pipe extends externally from the housing frame starting from the connection opening at the first incline opposite the first and second airflows and at a second incline in a peripheral direction.

2. A fan housing for a vehicle system, comprising:

a housing frame defining a connection opening at a periphery in an upper region of the housing frame for receiving suctioned particles;

a connection pipe fluidly coupled to the connection opening for suctioning particles therethrough, the connection opening disposed at a first incline in a rear direction;

a first airflow of particles suctioned through the connection pipe and into the housing frame via the connection opening, the first airflow flowing in a first flow direction;

a second airflow of particles configured to flow into the housing frame, the second airflow flowing in a second flow direction; and a partition extending into the fan housing downstream of the first and second airflows, the partition separating the first and second airflows from one another at the periphery in the upper region of the housing frame, the partition including a substantially vertical free end disposed within the periphery in the upper region of the housing frame, the free end being sharp-edged;

wherein the connection pipe extends externally from the housing frame starting from the connection opening at the first incline opposite the first and second airflows and at a second incline in a peripheral direction.

* * * * *